United States Patent
Ohashi et al.

(10) Patent No.: US 7,701,520 B2
(45) Date of Patent: Apr. 20, 2010

(54) LIQUID CRYSTAL PANEL AND DISPLAY DEVICE WITH DATA BUS LINES AND AUXILIARY CAPACITANCE BUS LINES BOTH EXTENDING IN THE SAME DIRECTION

(75) Inventors: Noriyuki Ohashi, Kawasaki (JP); Susumu Okazaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 692 days.

(21) Appl. No.: 11/051,550

(22) Filed: Feb. 4, 2005

(65) Prior Publication Data

US 2006/0066796 A1    Mar. 30, 2006

(30) Foreign Application Priority Data

Sep. 29, 2004    (JP)    ............................. 2004-283474

(51) Int. Cl.
G02F 1/1343    (2006.01)
(52) U.S. Cl. ......................................... 349/39; 349/139
(58) Field of Classification Search .................... 349/48, 349/54, 139, 39
See application file for complete search history.

(56) References Cited

U.S. PATENT DOCUMENTS 5,943,106 A * 8/1999 Sukenori et al. .............. 349/39
6,583,777 B2 * 6/2003 Hebiguchi et al. ............ 345/92
6,778,233 B2 8/2004 Matsuura et al.
6,809,719 B2 * 10/2004 Wu et al. ...................... 345/103
2003/0156243 A1 * 8/2003 Yoshihara et al. ........... 349/172
2003/0227591 A1 * 12/2003 Liu et al. ...................... 349/143
2004/0222960 A1 * 11/2004 Suzuki et al. .................. 345/98
2004/0263710 A1 * 12/2004 Song et al. ..................... 349/44

FOREIGN PATENT DOCUMENTS

| JP | 06-30412 | | 5/1994 |
| JP | 06-130412 | * | 5/1994 |
| JP | 10-232408 | | 9/1998 |
| JP | 2002311411 | | 10/2002 |
| KR | 2002-0041749 | | 6/2002 |

* cited by examiner

*Primary Examiner*—David Nelms
*Assistant Examiner*—Lauren Nguyen
(74) *Attorney, Agent, or Firm*—Greer, Burns & Crain, Ltd.

(57) ABSTRACT

In a TFT substrate partially constituting a liquid crystal panel, gate bus lines and data bus lines are provided in orthogonal directions to each other, and a switching element (TFT) is provided in the vicinity of each of intersecting points of these bus lines. Further, Cs bus lines forming auxiliary capacitances (Cs) together with picture element electrodes each of which is provided for each picture element are provided in the direction parallel to the data bus lines. The gate bus lines, the data bus lines, and the Cs bus lines are provided at equal wiring intervals, respectively, and picture element regions each having the shape of a square are delimited by the Cs bus lines as boundaries.

21 Claims, 7 Drawing Sheets

LIQUID CRYSTAL PANEL AND DISPLAY DEVICE WITH DATA BUS LINES AND AUXILIARY CAPACITANCE BUS LINES BOTH EXTENDING IN THE SAME DIRECTION

CROSS-REFERENCE TO RELATED APPLICATIONS

This application is based on and claims priority of Japanese Patent Application No. 2004-283474 filed on Sep. 29, 2004, the entire contents of which are incorporated herein by reference.

BACKGROUND OF THE INVENTION (a) Field of the Invention

The present invention relates to a liquid crystal display (LCD) device. More specifically, the present invention relates to an active matrix type liquid crystal panel and a liquid crystal display device adapted to improve an aperture ratio.

(b) Description of the Related Art

Liquid crystal display devices have the advantages in that they are thin and light and that they can be driven at low voltages and have low power consumption. Accordingly, liquid crystal display devices are used in various kinds of electronic devices such as televisions, desktop personal computers (PCs), notebook PCs, personal digital assistants (PDAs), mobile phones, and the like. In particular, active matrix liquid crystal display devices, in which a thin film transistor (TFT) as a switching element is provided for each picture element, exhibit excellent display characteristics, which are comparable to those of cathode ray tube (CRT) displays, because of high driving capabilities thereof, and therefore they have been widely used even in fields where CRT displays have been used heretofore, such as televisions and desktop PCs.

A typical liquid crystal display device has a structure in which liquid crystals are contained between two transparent substrates made of glass plates. On one substrate, a TFT, a picture element electrode, and the like, are formed for each picture element. On the other substrate, color filters, a common electrode (counter electrode), and the like, which face the picture element electrodes, are formed. In the description below, for convenience, the substrate on which the TFTs, the picture element electrodes, and the like, are formed is referred to as a "TFT substrate," and the substrate on which the color filters, the common electrode, and the like, are formed is referred to as a "counter substrate." Further, the structure including the TFT substrate, the counter substrate, and the liquid crystals contained therebetween is referred to as a "liquid crystal panel."

Figure 1:
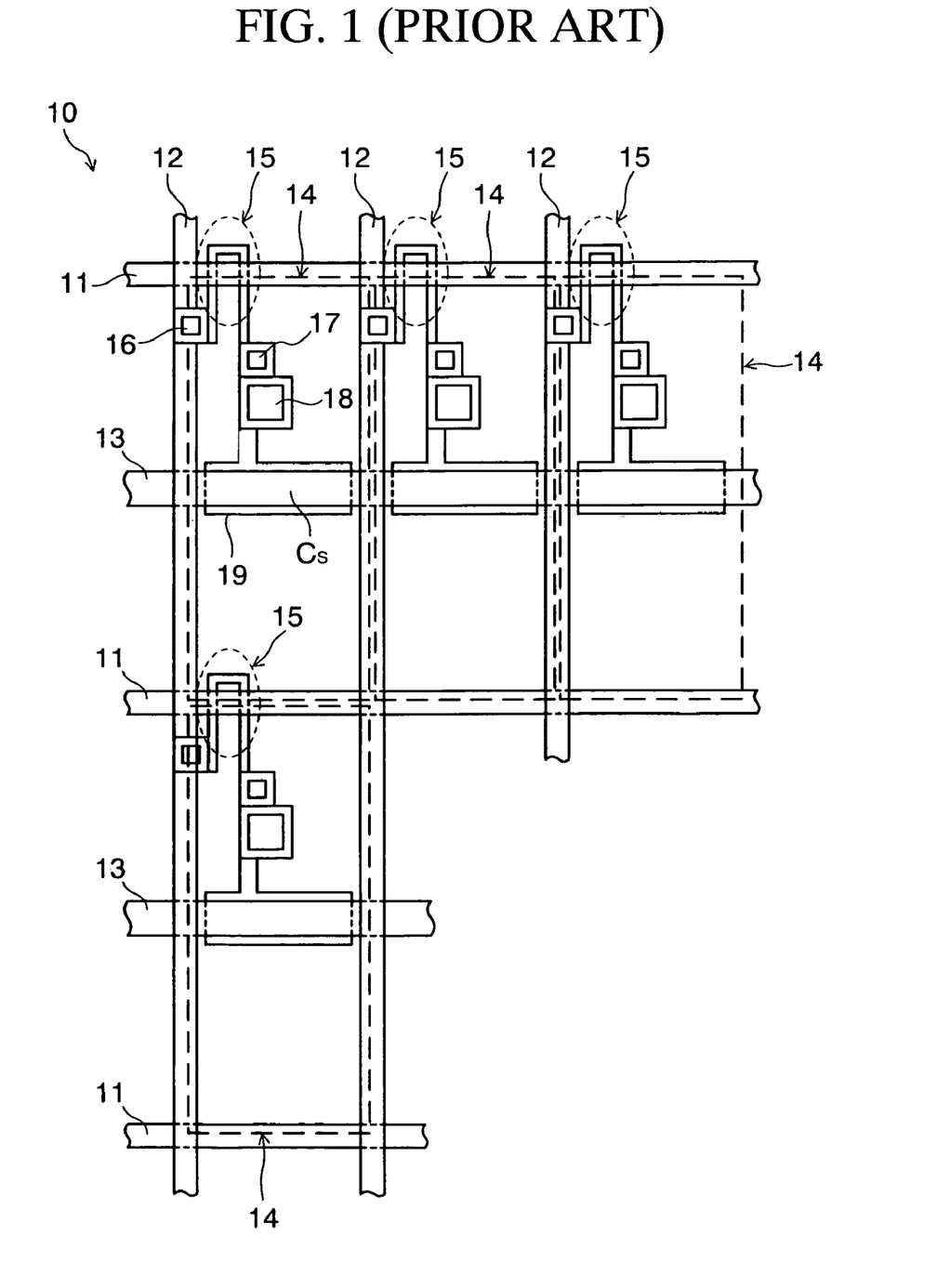
FIG. 1 is a plan view schematically showing the constitution of a TFT substrate in a prior art liquid crystal panel.

FIG. 1 schematically shows, in the form of a plan view, the constitution of a TFT substrate in a prior art active matrix liquid crystal panel.

As shown in the drawing, a plurality of gate bus lines 11 extending horizontally (laterally), a plurality of data bus lines 12 extending vertically (longitudinally), and a plurality of auxiliary capacitance (Cs) bus lines 13 extending parallel to the gate bus lines 11, are formed on the TFT substrate 10. The gate bus lines 11 and the Cs bus lines 13 are provided with the respective equal pitches (wiring intervals), and the data bus lines 12 are also provided with equal pitches (note, approximately ⅓ of the pitches of the gate bus lines 11 and the Cs bus lines 13). Thus, each region surrounded by two adjacent gate bus lines 11 and two adjacent data bus lines 12 constitutes a unit picture element. In the region of this unit picture element, a picture element electrode 14 (indicated by a dashed line) is formed. Different regions (picture element electrodes 14) of unit picture elements are provided for the colors of R (red), G (green), and B (blue), respectively. Three laterally adjacent R, G, and B sub-pixels constitute one picture element (pixel). Each of R, G, and B picture elements (sub-pixels) has a rectangular shape with an aspect ratio of approximately 3:1. It is noted that reference numeral 15 (portion surrounded by a dotted line) denotes two thin film transistors (TFTs) connected in series, reference numeral 16 denotes a contact hole for connecting the drain region of the TFTs 15 to the data bus line 12, reference numerals 17 and 18 denote contact holes for connecting the source region of the TFTs 15 to the picture element electrode 14, and reference numeral 19 denotes a semiconductor region forming an auxiliary capacitance Cs together with the Cs bus line 13 for each picture element.

As shown in FIG. 1, in the constitution of the prior art liquid crystal panel (TFT substrate 10), each of the R, G, and B picture elements (sub-pixels) constituting one picture element (pixel) has a rectangular shape with an aspect ratio of approximately 3:1. Accordingly, in order to reduce the area of a portion of the relevant picture element which does not effectively contribute to display, to a minimum (i.e., reduce a decrease in the aperture ratio to a minimum), it has been necessary to minimize the wiring length of the Cs bus line 13 crossing the relevant picture element region. For this purpose, the Cs bus lines 13 have needed to be provided parallel to the gate bus lines 11. In such a layout, the picture element regions (picture element electrodes 14) are necessarily defined by the data bus lines 12 as boundaries. Taking into consideration the overlaps with the picture element electrodes 14 and the distances between adjacent picture element electrodes 14, the wiring width of the data bus line 12 cannot be made too narrow. Namely, since the wiring width of the data bus line 12 needs to be appropriately made wide, it has caused a decrease in the aperture ratio.

Moreover, as the trend toward higher definition grows, a reduction in the time for writing into picture elements has posed a problem. For example, in the case where the frame frequency is 60 Hz (the number of frames scanned for one second is 60), the scanning time for one frame is approximately 16.7 ms (=1/60 s). In the case where the pixel format is VGA (Video Graphics Array: 640×480 picture elements), the time assigned for one horizontal line is approximately 32 μs. If the number of picture elements further increases (SVGA (Super VGA: 800×600 picture elements), XGA (eXtended GA: 1024×768 picture elements), or the like), the time assigned for one horizontal line is further reduced, and the time for writing into picture elements needs to be reduced correspondingly. In order to reduce this write time, for example, it can be considered that the transistor size of each picture element is increased. However, where the transistor size is increased, the area of a portion of the relevant picture element which does not effectively contribute to display increases. Accordingly, the aperture ratio decreases, and there occurs a problem in that display becomes dim.

Moreover, in a field sequential color system in which data is divided by time division for each of the colors of R, G, and B, or the like and written into picture elements and in which R, G, and B light sources or the like are time-sequentially turned on synchronously with the writing, there has occurred a problem in that the time assigned for one horizontal line is further reduced. For example, in a general active matrix LCD, in order to prevent flickers, a write operation is performed at approximately 60 Hz (1/60 s per one frame). In the case where field sequential drive is performed by constituting a color image for one frame using three fields of the three primary colors of RGB, a period for one field is 1/180 s (=1/60 s×⅓), and the time assigned for one horizontal line needs to be reduced by a factor of approximately ⅓. Namely, there has been a disadvantage in that the time allowable for writing is limited.

Furthermore, in the field sequential color system, after data (e.g., R data for one field) is written into all of the picture elements constituting one frame, the color of a light source needs to be switched (e.g., a light source of G or B needs to be turned on). Accordingly, the total time required for writing data of all the colors (R, G, and B) into all the picture elements becomes longer by an amount corresponding to the above-described switching. In particular, there has been a disadvantage in that the time for writing into all the picture elements increases as the number of picture elements increases.

Moreover, in an impulse drive system in which a light source is turned on in a pulsating manner (turned on only for a partial time of one-frame time) in order to improve the image quality of a moving video picture, the total time required for writing into all the picture elements also needs to be reduced. However, similar to the case of the above-described field sequential drive, there has been a disadvantage in that the time for writing into all the picture elements increases as the number of picture elements increases.

As the art relating to the above-described prior art, for example, as described in Japanese unexamined Patent Publication (JPP) 10-232408, there is a liquid crystal panel in which picture element electrodes and TFTs are formed to correspond to the intersections of control bus lines and data bus lines, in which capacitor bus lines forming auxiliary capacitances together with the picture element electrodes are formed, and which has auxiliary capacitance patterns branching from the capacitor bus lines and extending along the data bus lines. In this liquid crystal panel, where a short circuit between a data bus line and an auxiliary capacitance pattern is found out, the defective portion can be easily recovered. Further, as the art relating to the aforementioned field sequential drive, for example, as described in JPP 2002-311411, there is a technology in which a high-definition liquid crystal panel is realized using an amorphous silicon-type liquid crystal element and in which uniform back lighting is realized by adopting a point light source type as a back light necessary for the liquid crystal panel.

As described above, in the prior art, each of R, G, and B picture elements (sub-pixels) constituting one picture element (pixel) has a rectangular shape with an aspect ratio of approximately 3:1. This requires that the Cs bus lines 13 be provided parallel to the gate bus lines 11, and that the wiring width of the data bus line 12 be made wide accordingly. Consequently, there has been a problem in that the aperture ratio decreases. Further, with the development of the trend toward higher definition, there has been a problem in that a sufficient write time cannot be ensured for liquid crystal panels of drive systems in which the time allowable for writing into picture elements is limited, and for liquid crystal panels having a large number of picture elements.

SUMMARY OF THE INVENTION

An object of the present invention is to provide a liquid crystal panel and a liquid crystal display device in which the aperture ratio can be increased and in which the time for writing into all the picture elements can be reduced.

To attain the above object, according to one aspect of the present invention, there is provided a liquid crystal panel including: a plurality of gate bus lines extending in a first direction; a plurality of data bus lines extending in a second direction intersecting the first direction; a switching element provided for each picture element, the switching element using part of a corresponding gate bus line as a gate electrode and being electrically connected to a corresponding data bus line; a picture element electrode provided for each picture element and electrically connected to a corresponding switching element; a counter electrode placed with liquid crystals interposed between the counter electrode and the picture element electrode; and a plurality of auxiliary capacitance bus lines extending in the second direction and each forming an auxiliary capacitance together with the picture element electrode for each picture element, wherein a picture element region having the shape of a square is delimited by the respective auxiliary capacitance bus lines as boundaries.

In the constitution of the liquid crystal panel according to this aspect, the data bus lines extend in the second direction (direction parallel to the Cs bus lines) within the picture element regions. Further, unlike the prior art (FIG. 1) in which the picture element regions (picture element electrodes) are separated by the data bus lines as boundaries, the picture element regions (picture element electrodes) are separated by the Cs bus lines as boundaries. Accordingly, unlike the prior art, in designing the wiring width of the data bus line, it is unnecessary to take into consideration the overlaps with the picture element electrodes and the distances between adjacent picture element electrodes. Accordingly, the data bus lines can be made relatively narrow. As a result, the aperture ratio can be increased.

Moreover, in the prior art (FIG. 1), since the data bus lines intersect the Cs bus lines, wiring capacitances are considerably formed in the intersections of these bus lines. Meanwhile, in the constitution according to the present invention, since the data bus lines are provided parallel to the Cs bus lines (i.e., does not intersect), wiring capacitances are not substantially formed between these bus lines. Furthermore, since the data bus lines can be made narrow, wiring capacitances formed between the data bus lines and the picture element electrodes, and wiring capacitances formed between the data bus lines and the gate bus lines, can be made relatively small. This makes it possible to greatly reduce the total wiring capacitance of the data bus line in each of the picture elements. As a result, it is possible to reduce the time required for writing into each of the picture elements and, accordingly the time for writing into all the picture elements.

Also, according to another aspect of the present invention, there is provided a liquid crystal display device including: the liquid crystal panel according to claim 1; a gate driver for driving the plurality of gate bus lines; a data driver for driving the plurality of data bus lines; and a control unit into which a display signal and a timing signal are input and which controls the gate driver and the data driver, wherein two or more gate bus lines among the plurality of gate bus lines are simultaneously driven by the gate driver under control of the control unit, and the plurality of data bus lines are simultaneously driven by the data driver under control of the control unit, and display data are simultaneously written into a plurality of rows of picture elements corresponding to the gate bus lines simultaneously driven by the gate driver.

With the liquid crystal display device according to this aspect, in addition to the effects (increase in the aperture ratio, reduction in the write time) obtained in the liquid crystal panel according to the aforementioned aspect, the time for writing into all the picture elements can be greatly reduced (e.g., by a factor of approximately ½ in the case where the number of gate bus lines simultaneously driven is two), compared with that of a system in which data is written by sequentially driving each row of the picture elements corresponding to one gate bus line as heretofore. This is because two or more gate bus lines are simultaneously driven and display data is simultaneously written into the plurality of rows of the picture elements corresponding to these gate bus lines.

DESCRIPTION OF THE PREFERRED EMBODIMENTS

Hereinafter, embodiments of the present invention will be described with reference to the accompanying drawings.

First Embodiment

Figure 2:
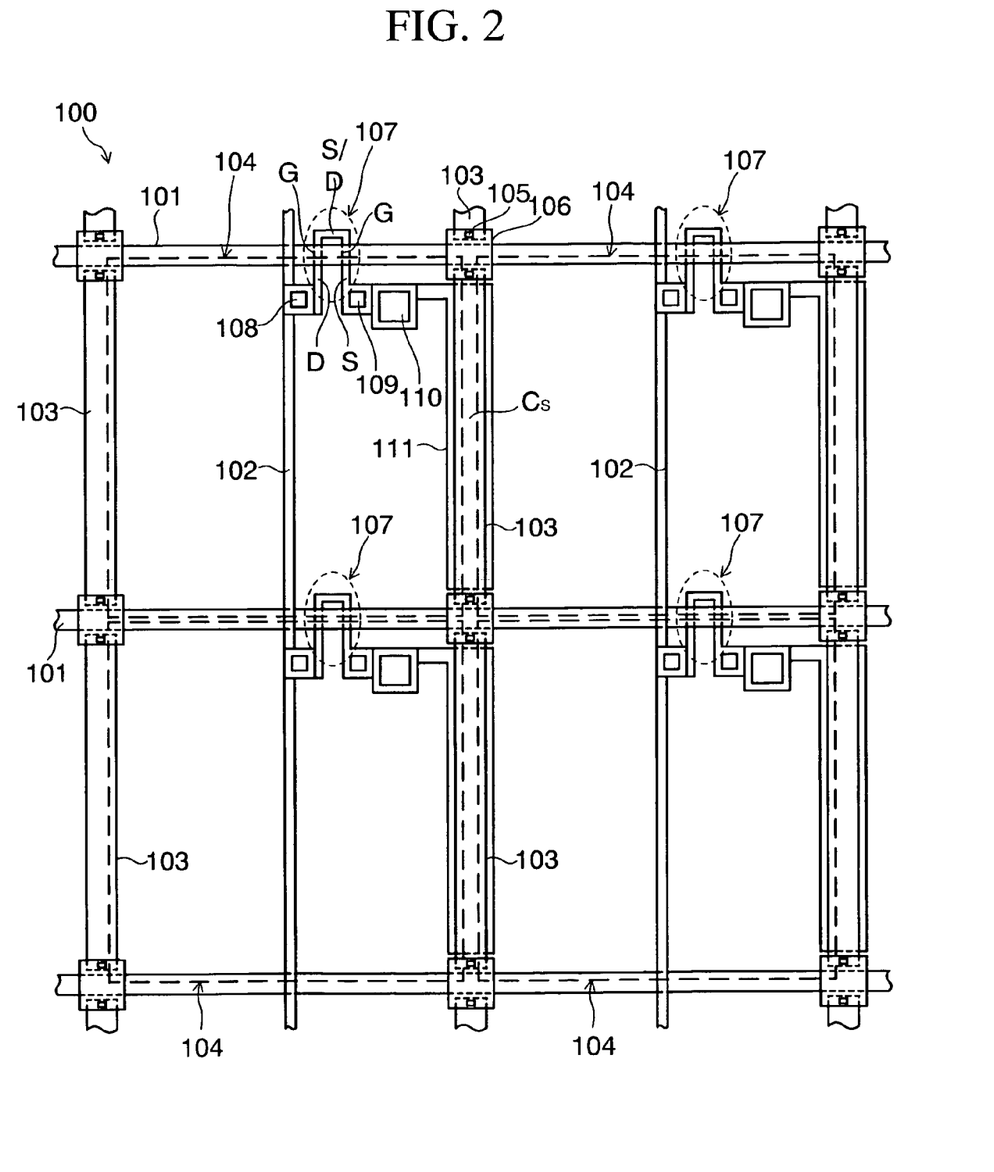
FIG. 2 is a plan view schematically showing the constitution of a TFT substrate in a liquid crystal panel according to a first embodiment of the present invention.
Figure 3:
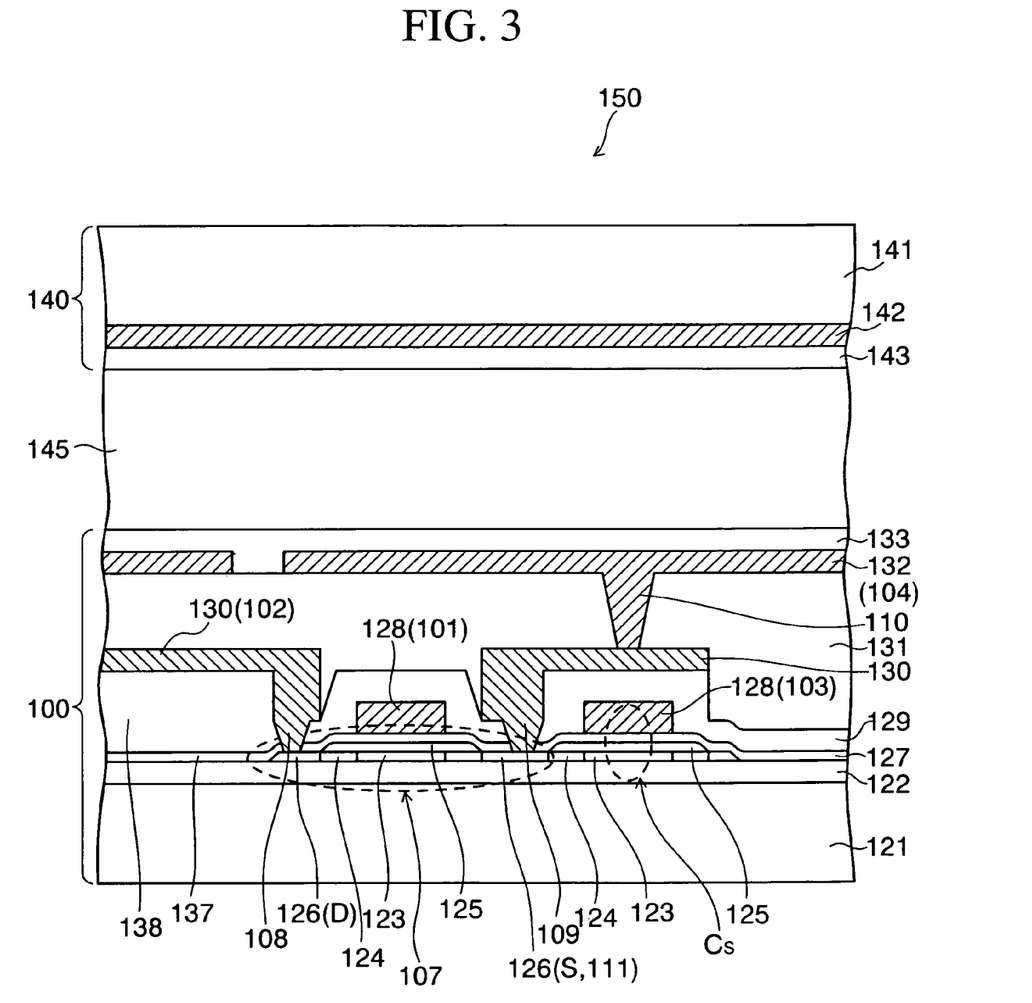
FIG. 3 is a cross-sectional view schematically showing the constitution of part of the liquid crystal panel according to the first embodiment.

FIG. 2 schematically shows, in the form of a plan view, the constitution of a TFT substrate in an active matrix liquid crystal panel according to a first embodiment of the present invention, and FIG. 3 schematically shows, in the form of a cross-sectional view, the constitution of part of the liquid crystal panel. In the example of FIG. 2, for simplification of illustration, a glass substrate, an interlayer insulating film, a gate insulating film, and the like, are omitted.

As shown in FIG. 3, the liquid crystal panel 150 according to the present embodiment includes a TFT substrate 100, a counter substrate 140, and a liquid crystal layer 145 made of liquid crystals contained between the TFT substrate 100 and the counter substrate 140. The layer structure of each substrate will be described later.

As shown in FIG. 2, a plurality of gate bus lines 101 extending horizontally (laterally), a plurality of data bus lines 102 extending vertically (longitudinally), and a plurality of auxiliary capacitance (Cs) bus lines 103 also extending vertically, are formed on the TFT substrate 100. The bus lines 101, 102, and 103 are provided with equal pitches (wiring intervals), respectively. Each square region surrounded by two adjacent gate bus lines 101 and two adjacent Cs bus lines 103 constitutes a "unit picture element." Namely, each picture element has Cs bus lines 103 and gate bus lines 101 as boundaries, and a picture element electrode 104 (indicated by a dashed line for better viewing of the drawing) is formed in the region of this picture element. In the example shown in the drawing, picture element electrodes 104 for four picture elements are shown. In the case where the wiring widths of the gate bus line 101 and the Cs bus line 103 are equal to each other, the shape of the picture element electrode 104 is also a square. However, in many cases, since the Cs bus lines 103 are relatively wider and picture element electrode intervals are selected wider in consideration of manufacturing yield, the shape of the picture element electrode 104 does not necessarily become square even if the shape of the unit picture element is the square.

Moreover, the data bus lines 102 are provided so as to longitudinally cross approximately the middles of the picture element regions (picture element electrodes 104) in the vertical direction (direction parallel to the Cs bus lines 103), and are isolated from the gate bus lines 101 with an insulating film interposed therebetween at the positions where the data bus lines 102 intersect the gate bus lines 101. The Cs bus lines 103 are provided along the boundaries between the picture element regions (picture element electrodes 104) in the vertical direction, and are similarly isolated from the gate bus lines 101 with an insulating film interposed therebetween at the positions where the Cs bus lines 103 intersect the gate bus lines 101. In this case, the Cs bus lines 103 are formed by patterning part of a conductive layer constituting the gate bus lines 101 as described later (i.e., the bus lines 101 and 103 become electrically shorted if they are simply crossed). Accordingly, as shown in FIG. 2, the Cs bus lines 103 are separated at the intersections with the gate bus lines 101. The separated Cs bus lines 103 are electrically connected to conductive layers 106 formed by patterning part of the conductive layer constituting the data bus lines 102, via contact holes 105 formed in the insulating film.

Furthermore, in each of the picture element regions, thin film transistors (TFTs) 107 as switching elements are provided so as to correspond to the intersection of the data bus line 102 and the gate bus line 101. The TFTs 107 (portion surrounded by a dotted line) include two TFTs which have lightly doped drain (LDD) structures and which are connected in series. In liquid crystal display devices, it is ideal that the state in which data (electric charge) is written into an auxiliary capacitance (Cs) of a picture element is maintained constant until the next data is written. However, the potential of the auxiliary capacitance is actually lowered due to a leakage current and the like in TFTs. Accordingly, in order to reduce the leakage current, TFTs are formed in LDD structures, and two TFTs are connected in series. Although two TFTs are connected in series in the present embodiment, it is a matter of course that the number of connected TFTs is not limited to two. Further, although two TFTs having LDD structures are also connected in series in each of the picture elements in other embodiments as described later, the number of connected TFTs is not similarly limited to two. In the description below, for convenience of explanation, two TFTs connected in series will be collectively called "TFT."

In each of the picture element regions, the TFT 107 (portion surrounded by a dotted line) uses part of the gate bus line 101 as a gate electrode G. Further, a drain region D and a source region S are placed with this gate bus line 101 interposed therebetween. The drain region D of the TFT 107 is electrically connected to the data bus line 102 via a contact hole 108 formed in an insulating film. On the other hand, the source region S is electrically connected to a conductive layer (not shown) via a contact hole 109 formed in an insulating film, and further electrically connected to the picture element electrode 104 via a contact hole 110 formed in an insulating film.

Moreover, reference numeral 111 denotes a semiconductor region forming the auxiliary capacitance Cs together with the Cs bus line 103 for each of the picture elements. The semiconductor region 111 is a region which functions as one electrode of the auxiliary capacitance Cs. This semiconductor region 111 is shared with the source region S of the TFT 107 as described later, and therefore electrically connected to the picture element electrode 104 via the contact holes 109 and 110. That is, the auxiliary capacitance Cs is formed between the Cs bus line 103 and the picture element electrode 104 from an electrical point of view.

Next, the layer structure of the liquid crystal panel 150 (the TFT substrate 100, the counter substrate 140, and the liquid crystal layer 145) of the present embodiment will be described with reference to FIG. 3. It is noted that, in the structure shown in FIG. 3, only one TFT 107 is shown for better viewing of the drawing.

On a glass substrate 121 which serves as the base of the TFT substrate 100, an insulating film 122 made of, for example, $SiO_2$ or SiN, is formed. Further, on predetermined regions (regions which are indicated by dashed lines in the drawing and in which the TFT 107 and the auxiliary capacitance Cs are to be formed) of the insulating film 122, a semiconductor layer 123 made of amorphous silicon or polysilicon is formed. Moreover, predetermined regions (regions in which the source/drain regions of the TFT 107 and one electrode region of the auxiliary capacitance Cs are to be formed) of the semiconductor layer 123 are doped with impurities, for example, such as phosphorus, boron, or the like, to form n-type or p-type semiconductor regions 124. Further, on the semiconductor layer 123 and the semiconductor regions 124, an insulating film 125 made of, for example, SiN, is formed. This insulating film 125 protects the channel of the TFT 107 and functions as part of dielectric material partially constituting the auxiliary capacitance Cs. Furthermore, regions around the n-type or p-type semiconductor regions 124 are doped with impurities, such as phosphorus, boron, or the like, at high density to form $n^+$-type or $p^+$-type semiconductor regions 126. A partial region of the semiconductor regions 126 is delimited as the drain region D of the TFT 107, and the other partial region thereof is delimited as the source region S of the TFT 107 and one electrode region 111 of the auxiliary capacitance Cs.

Moreover, an insulating film 127 made of, for example, $SiO_2$ or SiN, is formed on the entire surface to cover the insulating film 125 and the semiconductor regions 126. This insulating film 127 functions as a gate insulating film of the TFT 107 and functions as part of dielectric material partially constituting the auxiliary capacitance Cs. Further, on the insulating film 127, a conductive layer 128 made of, for example, aluminum (Al), molybdenum (Mo), or the like, and patterned into a required shape is formed. The conductive layer 128 includes the gate bus line 101 constituting the gate electrode G (FIG. 2) of the TFT 107 and the Cs bus line 103 constituting the other electrode of the auxiliary capacitance Cs.

Furthermore, an insulating film 129 made of, for example, $SiO_2$ or SiN, is formed on the entire surface to cover the conductive layer 128. On the insulating film 129, a conductive layer 130 made of, for example, Al, titanium (Ti), or the like, and patterned into a required shape is formed. The conductive layer 130 includes the data bus line 102 and the conductive layer 106 (FIG. 2), and interconnections for connecting to the picture element electrode 104 the TFT 107 and the auxiliary capacitance Cs. Accordingly, the conductive layer 130 is electrically connected to the heavily doped semiconductor regions 126 (the drain region D and source region S of the TFT 107, and one electrode region 111 of the auxiliary capacitance Cs) via the contact holes 108 and 109 formed in required positions in the insulating film 129.

Incidentally, in the example shown in the drawing, the auxiliary capacitance Cs is realized in the form of a "MOS (metal oxide (insulating film) semiconductor) capacitor" including the semiconductor region 126 (one electrode), the conductive layer 128 (other electrode), and the insulating films 125 and 127 (dielectric material) formed therebetween. However, instead of the MOS structure, the auxiliary capacitance Cs may be formed between the conductor layers 128 and 130.

Furthermore, a planarized insulating film 131 made of, for example, $SiO_2$ or SiN, is formed on the entire surface to cover the conductive layer 130 and the insulating film 129. On the insulating film 131, a conductive layer 132 patterned into a required shape is formed. The conductive layer 132 constitutes the picture element electrode 104 and is, for example, made of transparent conductive material such as indium tin oxide (ITO) or the like, in the case of a transmissive LCD, or made of Al, Al alloy, or the like, in the case of a reflective LCD. The conductive layer 132 (picture element electrode 104) is electrically connected via a contact hole 110 formed at a required position in the insulating film 131 to the conductive layer 130 including the interconnection connected to the TFT 107 and the auxiliary capacitance Cs.

Furthermore, an alignment film 133 made of polyimide resin or the like is formed to cover the surfaces of the conductive layer 132 (picture element electrode 104) and the insulating film 131. The alignment film 133 is for regularly aligning the directions (orientations) of liquid crystal molecules in the liquid crystal layer 145. In addition to the alignment film 133, for example, patterned protrusions having predetermined shapes as means for regulating the alignment (domains) of the liquid crystal molecules may be formed on the picture element electrode 104. Such protrusions can be formed using, for example, photoresist or the like. Various protrusions having the shapes of stripes, banks, hemispheres, pyramids, or the like, can be formed. Where such protrusions are formed, the alignment film 133 is formed to cover the protrusions.

On the other hand, on the surface (lower surface in the example of FIG. 3) of a glass substrate 141 which serves as the counter substrate 140, formed are a conductive layer 142 (common electrode or counter electrode) made of transparent conductive material, such as ITO or the like, and, although not shown, columnar spacers for maintaining the thickness (cell gap) of the liquid crystal layer 145 constant. The columnar spacers can be formed using photoresist or the like. Instead of these, spherical spacers made of silica, resin, or the like, may be filled into the liquid crystal layer 145. However, columnar spacers are more suitable for precisely regulating the cell gap. Furthermore, an alignment film 143 made of polyimide resin or the like is formed to cover the surface of the common electrode (conductive layer 142). In the counter substrate 140, protrusion patterns for domain regulation may also be formed on the common electrode 142 as needed, similarly to the TFT substrate 100 side. Incidentally, color filters are not provided in the counter substrate 140 shown in the drawing. This is because, in the present invention, it is mainly intended to drive an LCD in the field sequential color system using a liquid crystal panel for monochrome display as described later.

Moreover, as liquid crystals constituting the liquid crystal layer 145 of the liquid crystal panel 150, ferroelectric liquid crystals suitable for high-speed response are used. However, it is a matter of course that liquid crystal material is not limited to the above example. For example, it is possible to suitably use liquid crystals of twisted nematic (TN) mode, vertical alignment (VA) mode, multi-domain vertical alignment (MVA) mode, or the like.

As described above, in the constitution of the liquid crystal panel 150 (TFT substrate 100) according to the first embodiment (FIGS. 2 and 3), the data bus lines 102 extend approximately in the middles of the picture element regions (picture element electrodes 104) in the vertical direction (direction parallel to the Cs bus lines 103). Further, unlike the prior art (FIG. 1) in which the picture element regions (picture element electrodes 14) are separated by the data bus lines 12 as boundaries, the picture element regions (picture element electrodes 104) are separated by the Cs bus lines 103 as boundaries. Accordingly, unlike the prior art, in designing the wiring width of the data bus line 102, it is unnecessary to take into consideration the overlaps with the picture element electrodes and the distances between adjacent picture element electrodes. Accordingly, the data bus lines 102 can be made narrow. As a result, the aperture ratio can be increased.

Moreover, in the prior art (FIG. 1), since the data bus lines 12 intersect the Cs bus lines 13 having a relatively larger wiring width, wiring capacitances are considerably formed in the intersections of the bus lines 12 and 13. Meanwhile, in the present embodiment (FIG. 2), since the data bus lines 102 are placed parallel to the Cs bus lines 103 having a relatively larger wiring width (i.e., do not intersect), wiring capacitances are not substantially formed between the bus lines 102 and 103. Furthermore, since the data bus lines 102 can be made narrow, wiring capacitances formed between the data bus lines 102 and the picture element electrodes 104, and wiring capacitances formed between the data bus lines 102 and the gate bus lines 101, can be made relatively small. This makes it possible to greatly reduce the total wiring capacitance of the data bus line 102 in each of the picture elements. As a result, it is possible to reduce the time required for writing into each of the picture elements, and accordingly the time for writing into all the picture elements. This makes it possible to sufficiently ensure a write time even for liquid crystal panels of the field sequential color system in which the time allowable for writing into a picture element is limited, and for SVGA and XGA liquid crystal panels in which the number of picture elements is large.

Moreover, since the wiring capacitance of the data bus line 102 is reduced, the difference in time constant between the start point (top of the screen) and the end point (bottom of the screen) of the relevant data bus line 102 is reduced when a data signal is transmitted on the relevant data bus line 102. Accordingly, a difference in brightness between the top and bottom of the screen becomes hard to occur, and an occurrence of brightness unevenness can be suppressed (improvement in the brightness unevenness). In addition, since the data bus lines 102 are not used as the boundaries between the picture element regions (picture element electrodes 104), it is possible to effectively suppress an occurrence of lateral cross talk.

Second Embodiment

Figure 4:
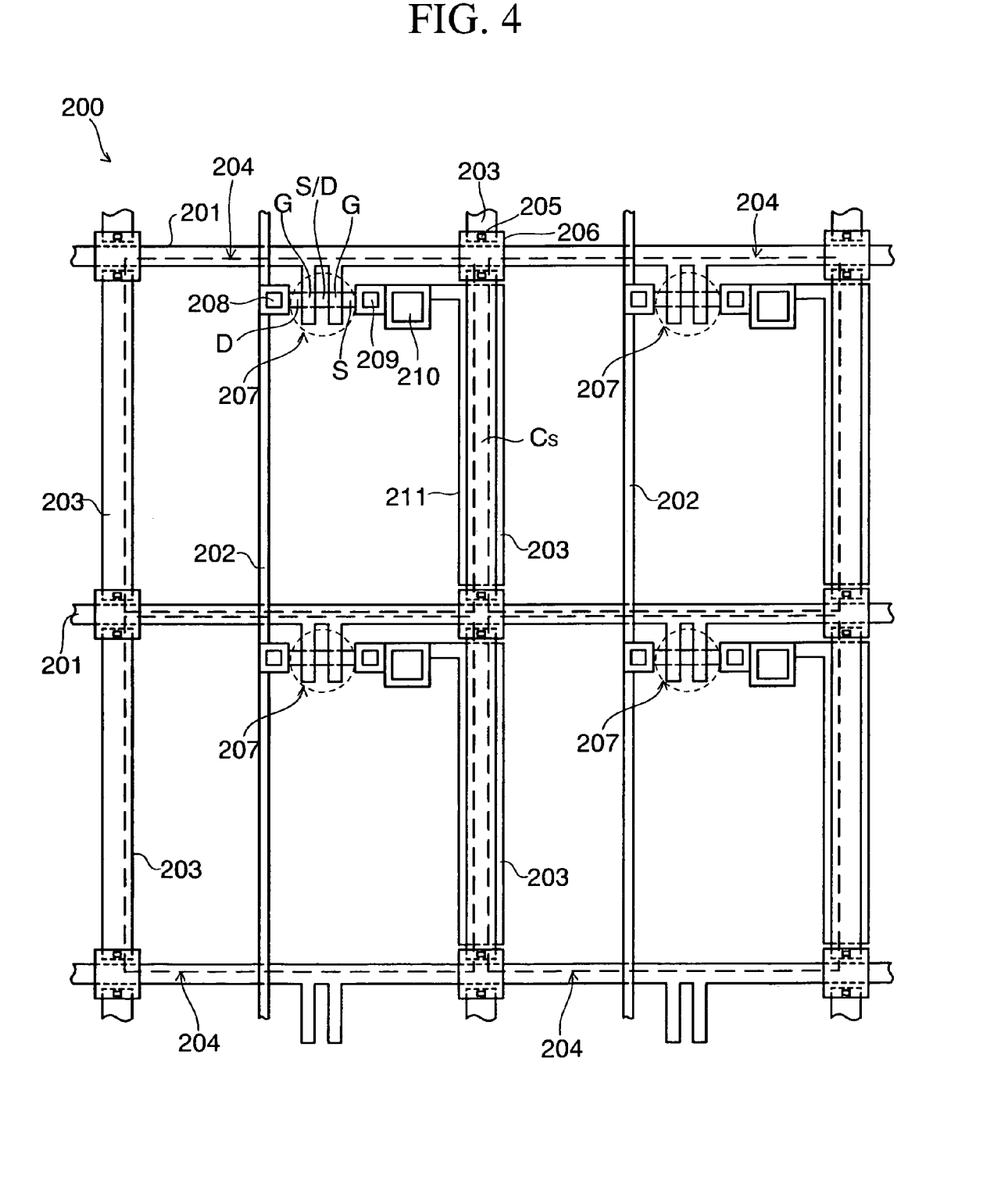
FIG. 4 is a plan view schematically showing the constitution of a TFT substrate in a liquid crystal panel according to a second embodiment of the present invention.

FIG. 4 schematically shows, in the form of a plan view, the constitution of a TFT substrate in an active matrix liquid crystal panel according to a second embodiment of the present invention.

The constitution of the TFT substrate 200 according to the second embodiment differs from that of the TFT substrate 100 (FIG. 2) according to the aforementioned first embodiment in that the shapes of TFTs 207 are different, i.e., that part (two positions) of a gate bus line 201 is formed so as to be protruded in a comb-like shape for each of the picture element regions (picture element electrode 204) and the protruded portions are used as the gate electrode G of the TFT 207. Other components and the operations or functions thereof are basically the same as those in the case of the first embodiment, and therefore will not be further described. It is noted that the components 201 to 211 shown in FIG. 4 correspond to the components 101 to 111 shown in FIG. 2, respectively.

The liquid crystal panel (TFT substrate 200) according to the second embodiment basically has the same constitution as that of the aforementioned first embodiment, and therefore also has effects similar to those (increase in the aperture ratio, reduction in the write time, improvement in the brightness unevenness, and suppression of lateral cross talk) obtained in the first embodiment.

Third Embodiment

Figure 5:
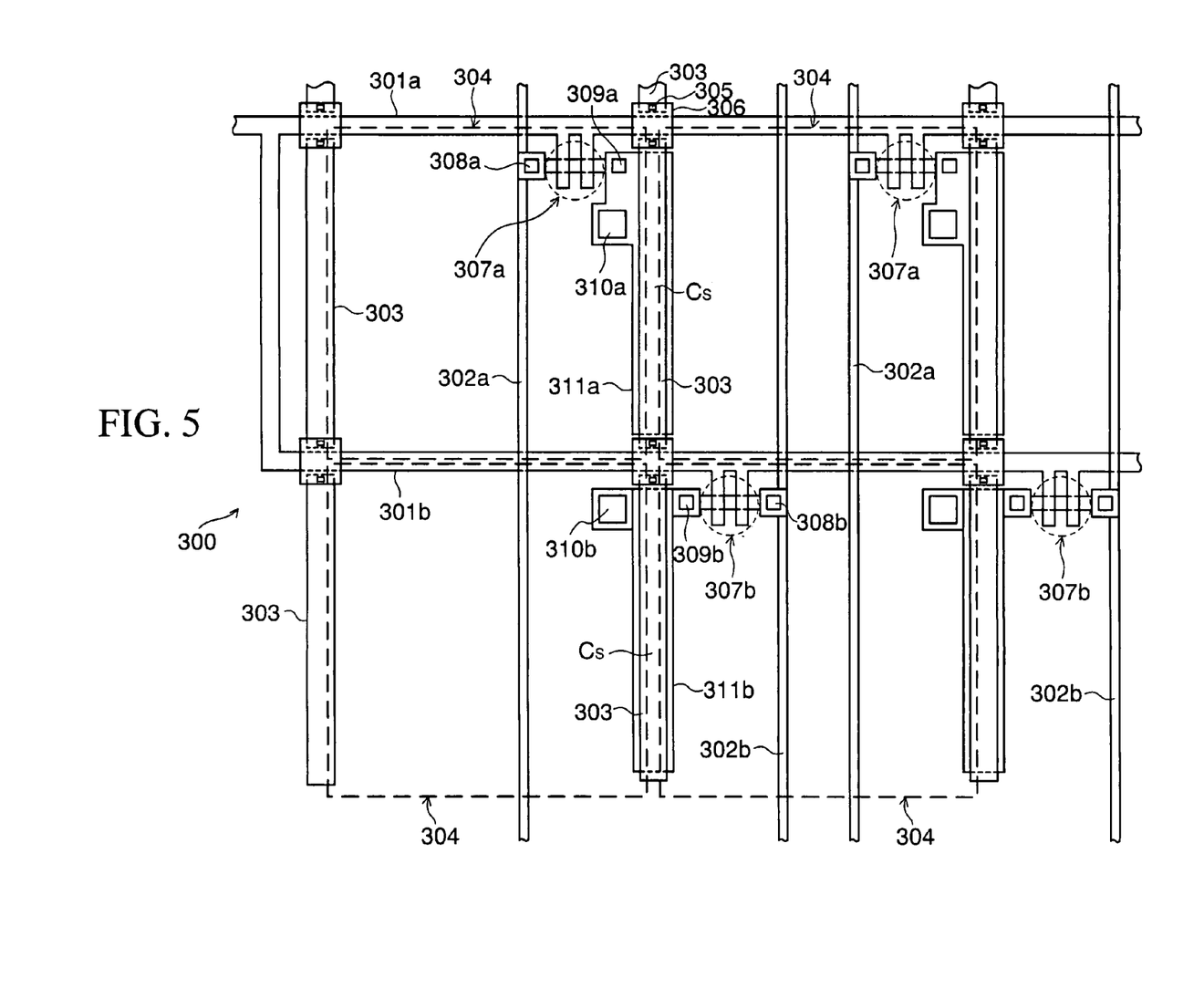
FIG. 5 is a plan view schematically showing the constitution of a TFT substrate in a liquid crystal panel according to a third embodiment of the present invention.

FIG. 5 schematically shows, in the form of a plan view, the constitution of a TFT substrate in an active matrix liquid crystal panel according to a third embodiment of the present invention.

The constitution of the TFT substrate 300 according to the third embodiment differs from that of the TFT substrate 100 (FIG. 2) according to the aforementioned first embodiment in the following points: wiring is made so that two adjacent horizontal lines (gate bus lines 301a and 301b) are simultaneously driven, and that on/off actions of TFTs 307a and 307b connected to two horizontal picture element rows corresponding to the two adjacent horizontal lines can be simultaneously controlled; wiring is made so that one or two data bus lines 302a and 302b are contained in each of the picture element regions; the shapes of the TFTs 307a and 307b are different similarly to the case of the second embodiment (FIG. 4); and the shapes of semiconductor regions 311a and 311b each forming an auxiliary capacitance Cs together with a Cs bus line 303 for each of the picture elements are different. Other components and the operations or functions thereof are basically the same as those in the case of the first embodiment, and therefore will not be further described. It is noted that the components 301a and 301b to 311a and 311b shown in FIG. 5 correspond to the components 101 to 111 shown in FIG. 2, respectively.

As shown in FIG. 5, one picture element column placed on each of both ends (left and right ends) in the horizontal direction is a picture element column containing only one data bus line provided in the vertical direction (direction parallel to the Cs bus lines 303). In the illustrated example, the picture element column at the left end contains one data bus line 302a, and other picture element columns (except the picture element column at the right end) each contain two data bus lines 302a and 302b. Further, each of the data bus lines 302a and 302b is contained in the corresponding picture elements together with the TFTs 307a or 307b driven via the relevant data bus line.

Moreover, in each of the picture element columns containing the two data bus lines 302a and 302b, data supplied to one data bus line is written into the picture element electrodes 304 in the concerned picture elements, and data supplied to the other data bus line is written into the picture element electrodes 304 in the other picture elements adjacent to the picture elements concerned. In the illustrated example, data supplied to the odd-numbered data bus lines 302a counted from the left is written via the TFT 307a in the corresponding picture element into the picture element electrode 304 in the picture element concerned. On the other hand, data supplied to the even-numbered data bus lines 302b counted from the left is written via the TFT 307b in the corresponding picture element into the picture element electrode 304 in the other picture element adjacent to the left side of the picture element concerned. Namely, each of the data bus lines 302a to which the TFTs 307a driven by the odd-numbered gate bus lines 301a are connected is in the picture element concerned, and each of the data bus lines 302b to which the TFTs 307b driven by the even-numbered gate bus lines 301b are connected is outside the picture element concerned. The data bus lines 301a and 301b are respectively provided on opposite sides of the Cs bus lines 303 with the Cs bus lines 303 interposed therebetween.

In addition to the effects (increase in the aperture ratio, reduction in the write time, improvement in the brightness unevenness, and suppression of lateral cross talk) obtained in the aforementioned first and second embodiments, the constitution of the liquid crystal panel (TFT substrate 300) according to the third embodiment makes it possible to reduce the time for writing into all the picture elements by a factor of approximately ½ compared with that of a system in which data is written by sequentially driving each horizontal picture element row as heretofore. This is because two adjacent horizontal lines (gate bus lines 301a and 301b) are simultaneously driven, and the TFTs 308a and 308b connected to the corresponding two horizontal picture element rows are simultaneously turned on, thereby simultaneously writing data via the relevant TFTs. In other words, since display data for one frame (one screen) can be displayed at approximately twice the speed, resolution can be approximately doubled.

Fourth Embodiment

Figure 6:
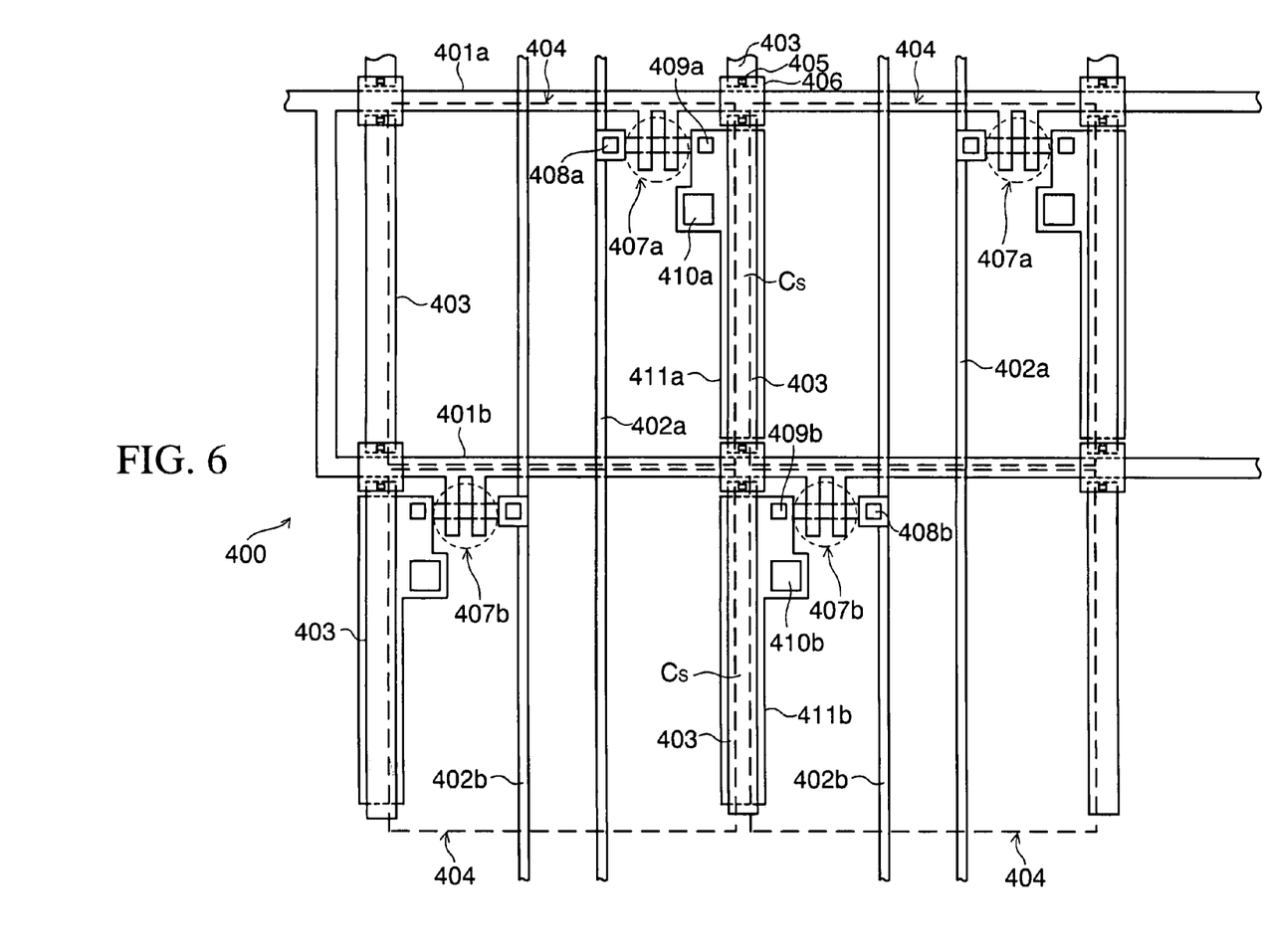
FIG. 6 is a plan view schematically showing the constitution of a TFT substrate in a liquid crystal panel according to a fourth embodiment of the present invention.

FIG. 6 schematically shows, in the form of a plan view, the constitution of a TFT substrate in an active matrix liquid crystal panel according to a fourth embodiment of the present invention.

The constitution of the TFT substrate 400 according to the fourth embodiment differs from that of the TFT substrate 300 (FIG. 5) according to the aforementioned third embodiment in the following points: wiring is made so that two data bus lines 402a and 402b are contained in each of the picture element regions; and the shapes of semiconductor regions 411b forming auxiliary capacitances Cs together with Cs bus lines 403 are different. Other components and the operations or functions thereof are basically the same as those in the case of the third embodiment, and therefore will not be further described. It is noted that the components 401a and 401b to 411a and 411b shown in FIG. 6 correspond to the components 301a and 301b to 311a and 311b shown in FIG. 5, respectively.

As shown in FIG. 6, among two data bus lines 402a and 402b provided in the vertical direction (direction parallel to the Cs bus lines 303) for each of the picture elements, the data bus line 402a at the right is connected to a TFT 407a driven by an odd-numbered gate bus line 401a, and the data bus line 402b at the left is connected to a TFT 407b driven by an even-numbered gate bus line 401b. For a picture element containing a TFT 407a, an auxiliary capacitance Cs is contained in the right end of the relevant picture element; for a picture element containing a TFT 407b, an auxiliary capacitance Cs is contained in the left end of the relevant picture element. Namely, the auxiliary capacitances Cs are provided in opposite directions in odd columns and even columns, respectively. However, if wiring modification is appropriately performed in a gate layer (corresponding to the conductive layer 128 in FIG. 3), it is also possible to provide all the auxiliary capacitances Cs in the same direction.

The feature of the structure of the TFT substrate 400 according to the fourth embodiment lies in that, unlike the case of the aforementioned third embodiment (FIG. 5), all of the data bus lines 402a and 402b, the TFTs 407a and 407b driven by the relevant data bus lines, and the picture element electrode 404 into which data is written via the relevant TFTs, are provided in the picture element concerned. As in the third embodiment, if data bus lines and TFTs are placed in the other picture element, the possibility that lateral cross talk occurs may increase. However, in the fourth embodiment, the above-described characteristic structure makes it possible to reduce the possibility of the occurrence of lateral cross talk.

Incidentally, in the above-described third and fourth embodiments (FIGS. 5 and 6), the explanation is given taking as an example the case where two adjacent horizontal lines (gate bus lines) are simultaneously driven. However, it is a matter of course that the number of horizontal lines simultaneously to be driven is not limited to two. It is also possible to simultaneously drive three or more horizontal lines. In this case, the time for writing into all the picture elements can be further reduced.

The TFT substrates 200, 300, and 400 (FIGS. 4 to 6) according to the aforementioned second to fourth embodiments differ from the TFT substrate 100 (FIG. 2) according to the aforementioned first embodiment in the wiring topology of data bus lines, the connection topology of TFTs, and the like, from a planar point of view. However, the cross-sectional structures of the respective liquid crystal panels constituted with the TFT substrates 200, 300, and 400 included therein are basically the same as the cross-sectional structure of the liquid crystal panel 150 (FIG. 3) according to the first embodiment. Accordingly, in the description below, the "liquid crystal panel 150" also means a liquid crystal panel according to any one of the second to fourth embodiments.

Next, a liquid crystal display device according to the present invention and a method of driving the same will be described.

Figure 7:
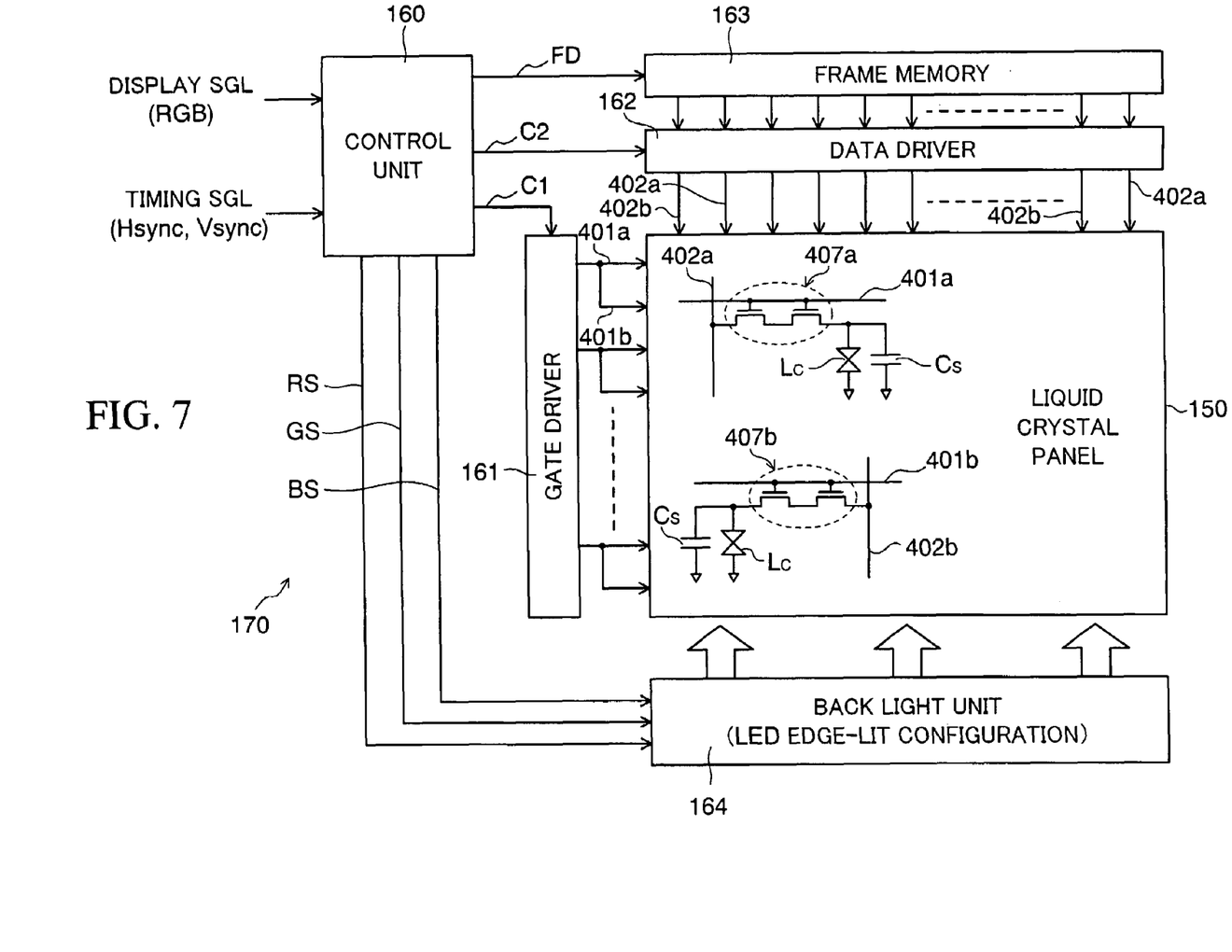
FIG. 7 is a block diagram showing the constitution of a liquid crystal display device in which the liquid crystal panel according to the third or fourth embodiment is used.

FIG. 7 shows, in the form of a block diagram, the constitution of a liquid crystal display device in which the liquid crystal panel according to any one of the aforementioned third embodiment (FIG. 5) and the fourth embodiment (FIG. 6) is used. In the example shown in FIG. 7, the constitution for the case where the liquid crystal panel 150 (TFT substrate 400) according to the fourth embodiment is used is shown.

The liquid crystal display device 170 shown in FIG. 7 includes the liquid crystal panel 150 for monochrome display in which color filters are not used, a control unit 160 for controlling field sequential drive for the liquid crystal panel 150, a gate driver 161 and a data driver 162 operatively connected to the liquid crystal panel 150, a frame memory 163 for temporarily storing display data (RGB image data, and black signal data if necessary) for one frame, a pair of polarizing plates (not shown) placed on both sides of the liquid crystal panel 150 with the liquid crystal panel 150 interposed therebetween, and a back light unit 164 placed on the back of the liquid crystal panel 150 with one polarizing plate interposed therebetween. In the present embodiment, each of the control unit 160, the gate driver 161, the data driver 162, and the frame memory 163 is realized by an IC, and the gate driver 161 and the data driver 162 are mounted on the peripheral portion of the liquid crystal panel 150. Further, although not particularly shown in FIG. 7, each circuit block is appropriately supplied with a necessary power supply voltage (e.g., high voltage of 18 V, low voltage of 3.3 V or 5 V, or ground voltage).

In a display part of the liquid crystal panel 150, a large number of picture elements are arranged in the form of a matrix. One picture element includes two TFTs 407a or 407b connected in series, a liquid crystal cell Lc, and an auxiliary capacitance Cs connected in parallel to the liquid crystal cell Lc. The liquid crystal cell Lc includes a picture element electrode 404 (FIG. 6), a common electrode 142 (FIG. 3), and a liquid crystal layer 145 between these electrodes. The auxiliary capacitance Cs includes a Cs bus line 403 (FIG. 6), a semiconductor region 411a or 411b, and insulating films 125 and 127 (FIG. 3) therebetween. Further, the gates of the TFTs 407a or 407b of each picture element row which are arranged in the horizontal direction are connected to the same gate bus line 401a or 401b, the drains of the TFTs 407a or 407b of each picture element column which are arranged in the vertical direction are connected to the same data bus line 402a or 402b, and the sources of the TFTs 407a and 407b are connected to the liquid crystal cells Lc and the auxiliary capacitances Cs.

The control unit 160 generates timing signals C1, C2, RS, GS, and BS, which are necessary to perform field sequential drive, and a display signal FD for one frame based on display signals (R, G, and B color signals) and timing signals (horizontal synchronous signal Hsync and vertical synchronous signal Vsync) supplied from an external device (not shown), such as a computer or the like. The generated display signal FD is supplied to the frame memory 163, the timing signals C1 and C2 are respectively supplied to the gate driver 161 and the data driver 162, and the timing signals RS, GS, and BS are supplied to the back light unit 164.

The gate driver 161 is initialized at the start time of each vertical synchronization period in response to the timing signal C1 supplied from the control unit 160, and sequentially outputs scan signals to groups of two adjacent horizontal lines (gate bus lines 401a and 401b) of the liquid crystal panel 150 with timing synchronized with one horizontal synchronization period. Namely, the gate bus lines of the liquid crystal panel 150 are sequentially brought into a state (selected state) where data can be written, in groups of two horizontal lines by the gate driver 161.

The data driver 162 sequentially generates display data for groups of two horizontal lines sequentially selected by the gate driver 161, based on the display signal FD for one frame, which is loaded from the control unit 160 into the frame memory 163, and the timing signal C2 supplied from the control unit 160, and outputs the generated display data to the data bus lines 402a and 402b. At this time, the generation and output of the display data are time-sequentially performed for the R, G, and B color signals.

Moreover, in the field sequential drive system intended by the present invention, it is necessary that data is divided by time division for each of the colors of R, G, and B to be written into picture elements, and that R, G, and B light sources are time-sequentially turned on synchronously with the writing. Accordingly, dedicated light sources are required. In the embodiment shown in FIG. 7, as the light sources, the back light unit 164 of a light emitting diode (LED) edge light type is provided. In this type, a cold cathode fluorescent lamp (CCFL) used as a light source of a back light of a general edge light type is replaced by arrayed LEDs. For example, a thin optical waveguide (not shown) made of transparent resin which has the same size as the back of the liquid crystal panel 150 and of which underside is tapered is placed on the back of the liquid crystal panel 150; a plurality of groups each including R, G, and B LEDs are arranged in edge portions (upper and lower, or left and right ends) of the optical waveguide; and each of R, G, and B color lights emitted from the respective LEDs synchronously with data write timing (i.e., the timing signals RS, GS, and BS supplied from the control unit 160) for each of the colors of R, G, and B is reflected by the underside (tapered surface) of the optical waveguide, and further applied from the back to the liquid crystal panel 150 through a diffusing film or the like (not shown). In this case, LEDs constituting each group generally include one for each of the colors of R, G, and B. However, taking into consideration that the brightness of G is relatively low, for example, one LED for each of R and B and two LEDs for G may be combined.

As the structure of the back light unit 164, an LED edge-lit configuration is adopted in the present embodiment. However, instead of this, for example, an LED area-lit configuration may be adopted. In this type, a plurality of groups each including R, G, and B LEDs are two-dimensionally arranged on the back of the liquid crystal panel 150 with a diffusion film or the like (not shown) interposed therebetween, and each of R, G, and B color lights emitted from the respective LEDs synchronously with data write timing for each of the colors similarly to the above is applied from the back of the liquid crystal panel 150 directly through the diffusing film or the like.

In a field sequential drive system, as described above, full-color display is realized by displaying images of the three primary colors of RGB time-sequentially in the same picture elements. Conceivable operation modes include a drive method in which data for three screens of R, G, and B is written into one frame, a drive method in which data for a total of six screens is written into one frame by writing black signals between R, G, and B color signals once each, a drive method in which data for a total of 12 screens is written by writing R, G, and B color signals and black signals between the color signals twice each, and the like.

In the field sequential drive according to the present embodiment, first, RGB image data (and black signal data between the colors) for one frame is loaded into the frame memory 163. Next, with the timing of applying any light (e.g., red (R) light) from the back of the liquid crystal panel 150 by controlling the LEDs of the back light unit 164, scan signals are simultaneously output from the gate driver 161 to two adjacent horizontal lines (gate bus lines 401a and 401b) in the liquid crystal panel 150, and the data driver 162 reads display data corresponding to the two horizontal lines from the frame memory 163, thus outputting the display data to the data bus lines 402a and 402b. At this time, the TFTs 407a and 407b of the picture element rows corresponding to the selected two horizontal lines (gate bus lines 401a and 401b) are turned on, the display data is written into the corresponding auxiliary capacitances Cs via the relevant TFTs, and the written data is maintained until the next data is written.

After data (R data for one field in this case) has been written into all the picture elements constituting one frame as described above, the back light unit 164 is controlled to switch the color of the light source (LED) to green (G) or blue (B), and an operation similar to the above is performed, thus writing data of all colors into all the picture elements. The voltage of the written display data is applied across both ends of the liquid crystal cell Lc (applied between the picture element electrode and the counter electrode). This changes the orientations of liquid crystal molecules in the liquid crystal cell Lc, and the light transmittance of the liquid crystal cell Lc accordingly changes, thus displaying a desired image.

Incidentally, in the constitution of the liquid crystal display device 170 shown as an example in FIG. 7, the data driver 162 is placed on one side (upper side) of the screen (liquid crystal panel 150). However, where the number of horizontal lines simultaneously to be driven is large, data to be drivers may be placed both above and below the screen with the screen interposed therebetween. In this case, for example, the data driver placed on the upper side may drive odd-numbered data bus lines, and the data driver placed on the lower side may drive even-numbered data bus lines.

What is claimed is:

1. A liquid crystal panel comprising:
   a plurality of gate bus lines extending in a first direction;
   a plurality of data bus lines extending in a second direction intersecting the first direction;
   a switching element provided for each picture element, the switching element using part of a corresponding gate bus line as a gate electrode and being electrically connected to a corresponding data bus line;
   a picture element electrode provided for each picture element and electrically connected to a corresponding switching element;
   a counter electrode placed with liquid crystals interposed between the counter electrode and the picture element electrode; and
   a plurality of auxiliary capacitance bus lines extending only in the second direction, without extending in the first direction across the picture element electrode, wherein each auxiliary capacitance bus line forms auxiliary capacitances together with a plurality of said picture element electrodes,
   wherein each of said picture element electrodes has the shape of a square and is delimited by the respective auxiliary capacitance bus lines as boundaries.

2. The liquid crystal panel according to claim 1, wherein the plurality of data bus lines are provided so that one data bus line is contained in a region corresponding to each row of picture elements placed in the second direction.

3. The liquid crystal panel according to claim 1, wherein the plurality of data bus lines are provided so that one data bus line is contained in a region corresponding to, among respective rows of picture elements placed in the second direction, one row placed at each of both ends, and so that two data bus lines are contained in each of other rows of picture elements.

4. The liquid crystal panel according to claim 3, wherein in each row of picture elements containing the two data bus lines, one data bus line is connected via a switching element in the picture element concerned in the relevant row of picture elements to the picture element electrode in the picture element concerned, and another data bus line is connected via a switching element in the other picture element concerned in the relevant row of picture elements to the picture element electrode in another picture element adjacent to the other picture element concerned in the first direction.

5. The liquid crystal panel according to claim 1, wherein the plurality of data bus lines are provided so that two data bus lines are contained in a region corresponding to each row of picture elements placed in the second direction.

6. The liquid crystal panel according to claim 5, wherein in each row of picture elements containing the two data bus lines, one data bus line is connected via a switching element in the picture element concerned in the relevant row of picture elements to the picture element electrode in the picture element concerned, and another data bus line is connected via a switching element in the other picture element concerned in the relevant row of picture elements to the picture element electrode in the other picture element concerned.

7. The liquid crystal panel according to claim 1, wherein the gate electrode partially constituting the switching element includes a portion formed by protruding part of the corresponding gate bus line in a comb-like shape.

8. The liquid crystal panel according to claim 1, wherein the liquid crystals are ferroelectric liquid crystals.

9. A liquid crystal display device comprising:
   a liquid crystal panel including:
   a plurality of gate bus lines extending in a first direction;
   a plurality of data bus lines extending in a second direction intersecting the first direction;
   a switching element provided for each picture element, the switching element using part of a corresponding gate bus line as a gate electrode and being electrically connected to a corresponding data bus line;
   a picture element electrode provided for each picture element and electrically connected to a corresponding switching element;
   a counter electrode placed with liquid crystals interposed between the counter electrode and the picture element electrode; and
   a plurality of auxiliary capacitance bus lines extending only in the second direction, without extending in the first direction across the picture element electrode, wherein each auxiliary capacitance bus line forms auxiliary capacitances together with a plurality of said picture element electrodes,
   wherein each of said picture element electrodes has the shape of a square and is delimited by the respective auxiliary capacitance bus lines as boundaries;
   the liquid crystal display device further including:
   a gate driver for driving the plurality of gate bus lines;
   a data driver for driving the plurality of data bus lines; and
   a control unit into which a display signal and a timing signal are input and which controls the gate driver and the data driver,
   wherein two or more gate bus lines among the plurality of gate bus lines are simultaneously driven by the gate driver under control of the control unit, and
   the plurality of data bus lines are simultaneously driven by the data driver under control of the control unit, and display data are simultaneously written into a plurality of rows of picture elements corresponding to the gate bus lines simultaneously driven by the gate driver.

10. The liquid crystal display device according to claim 9, further comprising a back light unit including a light source for each of a plurality of colors and applying light of the light source turned on under control of the control unit from the back of the liquid crystal panel,
    wherein display data is divided by time division for each color and written into the plurality of rows of picture elements corresponding to the gate bus lines simultaneously driven by the gate driver and the data driver under control of the control unit, and simultaneously with the writing of display data, the respective light sources for the colors are time-sequentially turned on by the back light unit.

11. The liquid crystal display device according to claim 10, further comprising a memory for temporarily storing display data for one frame supplied from the control unit,
    wherein under control of the control unit, the data driver reads, from the memory, display data to be written into the plurality of rows of picture elements corresponding to the gate bus lines simultaneously driven by the gate driver, and outputs the read display data to the plurality of data bus lines.

12. The liquid crystal display device according to claim 10, wherein the light source for each color which partially constitutes the back light unit is a light emitting diode.

13. The liquid crystal panel according to claim 1, wherein each square picture element electrode is delimited by adjacent gate bus lines, in the first direction, as well as by auxiliary capacitance bus lines, in the second direction, as boundaries.

14. A liquid crystal panel comprising:
a plurality of gate bus lines extending in a first direction;
a plurality of data bus lines extending in a second direction intersecting the first direction;
a switching element provided for each picture element, the switching element using part of a corresponding gate bus line as a gate electrode and being electrically connected to a corresponding data bus line;
a picture element electrode provided for each picture element and electrically connected to a corresponding switching element;
a counter electrode placed with liquid crystals interposed between the counter electrode and the picture element electrode;
a plurality of auxiliary capacitance bus lines extending only in the second direction, without extending in the first direction across the picture element electrode, wherein each auxiliary capacitance bus line forms an auxiliary capacitance together with the picture element electrode for each picture element,
wherein each of said picture element electrodes has the shape of a square and is delimited by the respective auxiliary capacitance bus lines as boundaries,
wherein each square picture element electrode is delimited by adjacent gate bus lines, in the first direction, as well as by auxiliary capacitance bus lines, in the second direction, as boundaries, and
wherein the data bus lines cross a middle portion of the square picture element electrode associated therewith.

15. The liquid crystal panel according to claim 14, wherein the data bus lines that cross the middle portion of the square picture element electrode associated therewith cross at an area approximately equidistant from the auxiliary capacitance bus lines associated therewith.

16. The liquid crystal display device according to claim 9, wherein each square picture element electrode is delimited by adjacent gate bus lines, in the first direction, as well as by auxiliary capacitance bus lines, in the second direction, as boundaries; and
wherein the data bus lines cross a middle portion of the square picture element electrode associated therewith.

17. The liquid crystal display device according to claim 16, wherein the data bus lines that cross the middle portion of the square picture element electrode associated therewith cross at an area approximately equidistant from the auxiliary capacitance bus lines associated therewith.

18. The liquid crystal panel according to claim 1, wherein at least some of auxiliary capacitance bus lines form auxiliary capacitances with multiple picture element electrodes that are aligned with each other in said second direction.

19. The liquid crystal display device according to claim 9, wherein at least some of auxiliary capacitance bus lines form auxiliary capacitances with multiple of picture element electrodes that are aligned with each other in said second direction.

20. The liquid crystal panel according to claim 1, wherein at least some of auxiliary capacitance bus lines form auxiliary capacitances with multiple picture element electrodes that are adjacent to each other in said second direction.

21. The liquid crystal display device according to claim 9, wherein at least some of auxiliary capacitance bus lines form auxiliary capacitances with multiple of picture element electrodes that are adjacent to each other in said second direction.

* * * * *